US009483839B1

(12) United States Patent
Kwon et al.

(10) Patent No.: US 9,483,839 B1
(45) Date of Patent: Nov. 1, 2016

(54) OCCLUSION-ROBUST VISUAL OBJECT FINGERPRINTING USING FUSION OF MULTIPLE SUB-REGION SIGNATURES

(71) Applicant: The Boeing Company, Chicago, IL (US)

(72) Inventors: Hyukseong Kwon, Oak Park, CA (US); Yuri Owechko, Newbury Park, CA (US); Kyungnam Kim, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/705,473

(22) Filed: May 6, 2015

(51) Int. Cl.
*G06K 9/00* (2006.01)
*G06T 7/20* (2006.01)
*G06T 7/00* (2006.01)
*H04N 9/64* (2006.01)
*H04N 5/33* (2006.01)

(52) U.S. Cl.
CPC .......... *G06T 7/2006* (2013.01); *G06T 7/0097* (2013.01); *H04N 5/33* (2013.01); *H04N 9/646* (2013.01); *G06T 2207/10032* (2013.01); *G06T 2207/10048* (2013.01); *G06T 2207/30236* (2013.01); *G06T 2207/30252* (2013.01)

(58) Field of Classification Search
CPC .......... G06T 2207/10016; G06T 2207/20144; G06T 7/2033; G06T 7/2006; G06T 7/20; G06K 9/00744; G06K 9/3241; G06K 9/00771
See application file for complete search history.

(56) References Cited

U.S. PATENT DOCUMENTS 8,811,670 B2   8/2014   Mundhenk et al.
9,147,260 B2 *   9/2015   Hampapur ............ G06T 7/2006
2010/0054536 A1 *   3/2010   Huang ..................... G06K 9/32
                                                           382/103
2015/0077639 A1 *   3/2015   Chamaret ............ H04N 1/6075
                                                           348/708
2015/0220789 A1 *   8/2015   Wood .................... G06T 7/0081
                                                           382/103
2015/0248586 A1 *   9/2015   Gaidon ............. G06K 9/00711
                                                           382/103

OTHER PUBLICATIONS

S. Ali, V. Reilly, and M. Shah, "Motion and Appearance Contexts for Tracking and Re-Aquiring Targets in Aerial Video." In Proc. IEEE International Conference on Computer Vision and Pattern Recognition, 2007.
Y. Guo, S. Hsu, Y. Shan, H. Sawhney, and R. Kumar, "Vehicle Fingerprinting for Reacquisition & Tracking in Videos." In Proc. IEEE International Conference on Computer Vision and Pattern Recognition, 2005.
C. Arth, C. Leistner and H. Bischof, "Object Reacquisition and Tracking in Large-Scale Smart Camera Networks," IEEE International Conference on Distributed Smart Cameras, 2007.
(Continued)

*Primary Examiner* — Phuoc Tran
(74) *Attorney, Agent, or Firm* — McDonnell Boehnen Hulbert & Berghoff LLP

(57) ABSTRACT

Within examples, methods and systems for occlusion-robust object fingerprinting using fusion of multiple sub-region signatures are described. An example method includes receiving an indication of an object within a sequence of video frames, selecting from the sequence of video frames a reference image frame indicative of the object and candidate image frames representative of possible portions of the object, dividing the reference image frame and the candidate image frames into multiple cells, defining for the reference image frame and the candidate image frames sub-regions of the multiple cells such that the sub-regions include the same cells for overlapping representations and the sub-regions include multiple sizes, comparing characteristics of sub-regions of the reference image frame to characteristics of sub-regions of the candidate image frames and determining similarity measurements, and based on the similarity measurements, tracking the object within the sequence of video frames.

20 Claims, 8 Drawing Sheets

(56) References Cited

OTHER PUBLICATIONS

Y. Ke and R. Sukthankar, "PCA-SIFT: A More Distinctive Representation for Local Image Descriptors," In Proc. IEEE International Conference on Computer Vision and Pattern Recognition, 2004.

T. N. Mundhenk, K.-Y. Ni, Y. Chen, K. Kim and Y. Owechko, "Detection of unknown targets from aerial camera and extraction of simple object fingerprints for the purpose of target reacquisition," Proc. SPIE 8301, Intelligent Robots and Computer Vision XXIX: Algorithms and Techniques, 83010H (Jan. 23, 2012).

K. Kim, Y. Chen, A. Honda, C. Jeong, S. Cheng, L. Zhang and D. Khosla, "Bio-inspired Algorithms for Target Detection and Classification in Airborne Videos," Association for Unmanned Vehicle Systems International, North America 2012.

D. Khosla, Y. Chen, K. Kim, S. Cheng, A. Honda and L. Zhang, "A neuromorphic system for object detection and classification", SPIE Defense, Security, and Sensing 2013.

C. Poynton, Digital Video and HDTV, Chapter 24, pp. 284-285, Morgan Kaufmann, 2003.

S. Kullback and R.A. Leible, "On Information and Sufficiency," Annals of Mathematical Statistics 22 (1): pp. 79-86, 1951.

* cited by examiner

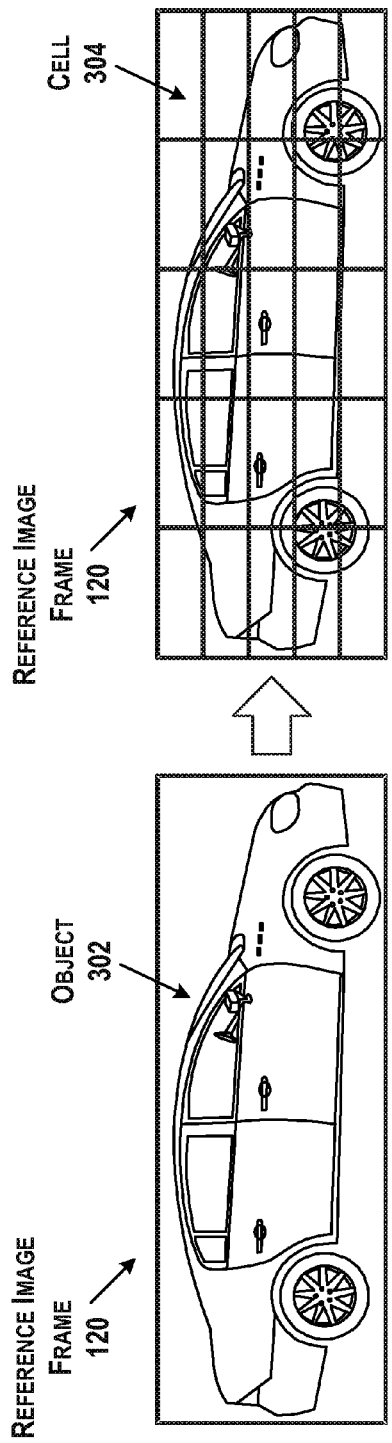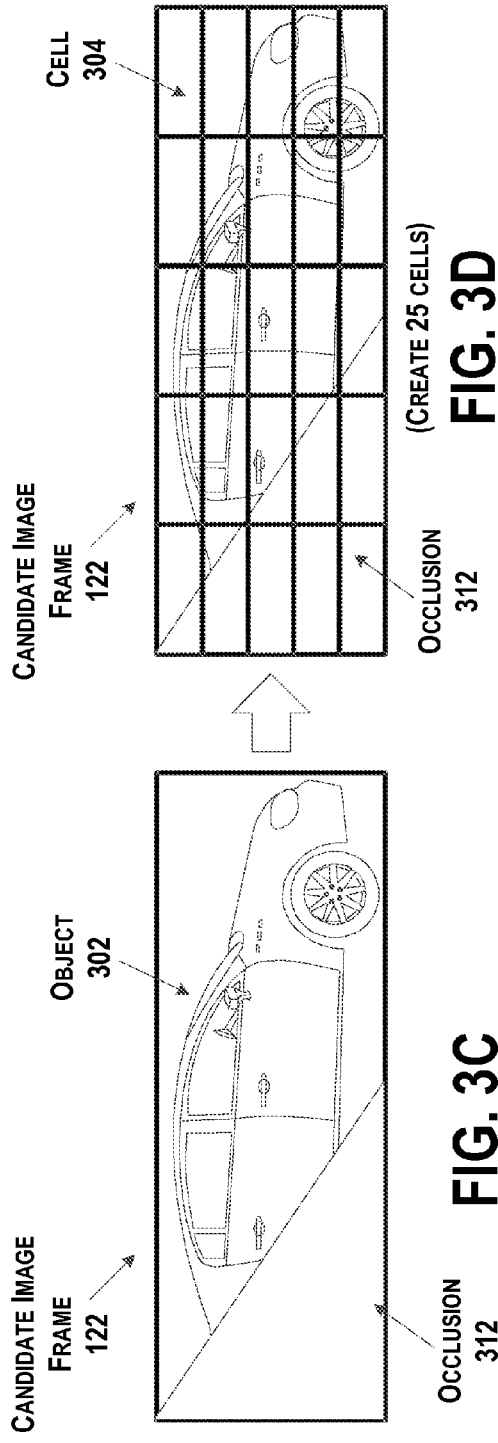

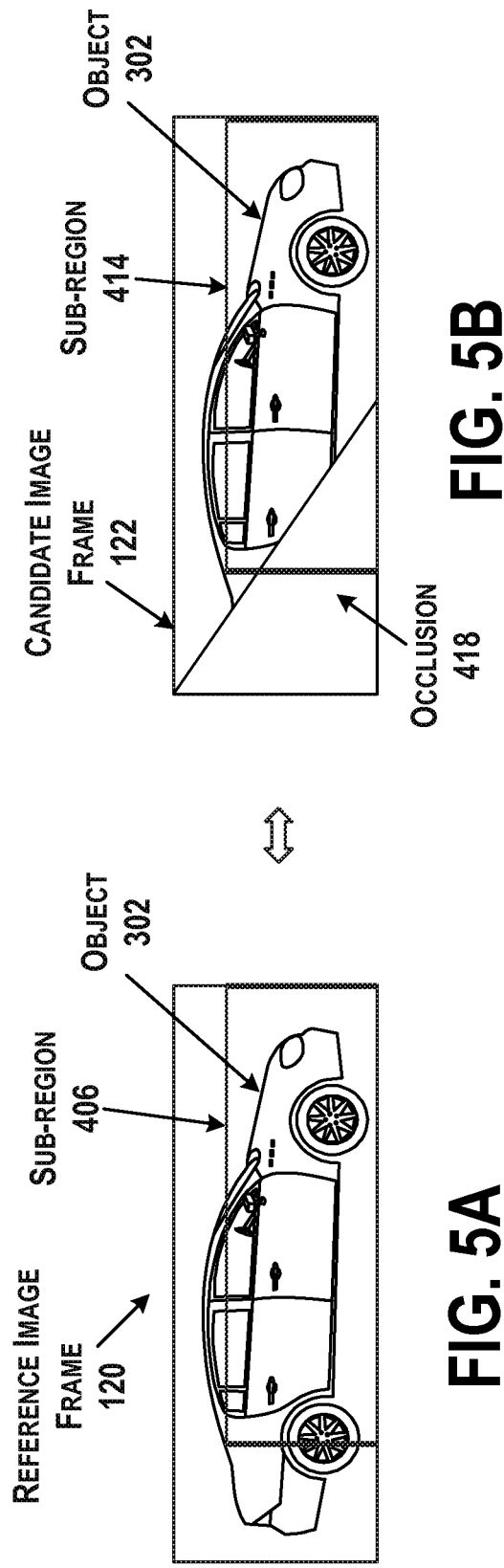

OCCLUSION-ROBUST VISUAL OBJECT FINGERPRINTING USING FUSION OF MULTIPLE SUB-REGION SIGNATURES

FIELD

The present disclosure relates generally to target or object tracking, such as by manned or unmanned aerial vehicles, in example environments that may cause occlusion or partial occlusion of the object within a sequence of video frames.

BACKGROUND

In unmanned aerial vehicle (UAV) surveillance and target tracking operations, persistent and robust target tracking/re-acquisition/re-identification is needed. However, in urban environments, target loss situations are often confronted due to partial or total occlusion by buildings, bridges, or other landmarks. Existing techniques for reacquisition of a target may analyze a motion of a target on a road, for example, and try to reacquire a target location using an assumption of linear or close to linear target trajectories. Other existing techniques may perform vehicle fingerprinting using line segment features of the tracked vehicles by determining an orientation of the vehicle (e.g., by aligning collection of line features from the vehicle into a rectangular cuboid), and estimates matching using a likelihood method for line segments.

Existing techniques may not be applicable in all operations. For examples, trajectory matching may not apply to objects that have dynamic trajectories or trajectories that do not follow roads or landmarks. Further, clear image quality and large target sizes may be required in order to extract a sufficient number of line features from vehicles, however, in practice, it can be difficult to acquire clear and large target images at all times from the UAVs.

SUMMARY

In one example, a method is described. The method includes receiving an indication of an object within a sequence of video frames, selecting, from the sequence of video frames, a reference image frame indicative of the object and candidate image frames representative of possible portions of the object, dividing the reference image frame and the candidate image frames into multiple cells, and defining, for the reference image frame and the candidate image frames, a plurality of sub-regions of the multiple cells. One or more of the sub-regions include the same cells for overlapping representations and the plurality of sub-regions include multiple sizes. The method also includes comparing characteristics of the plurality of sub-regions of the reference image frame to characteristics of the plurality of sub-regions of the candidate image frames and determining similarity measurements, and based on the similarity measurements, tracking the object within the sequence of video frames.

In another example, a non-transitory computer readable medium having stored thereon instructions that, upon execution by a computing device, cause the computing device to perform functions is described. The functions comprise receiving an indication of an object within a sequence of video frames, selecting, from the sequence of video frames, a reference image frame indicative of the object and candidate image frames representative of possible portions of the object, dividing the reference image frame and the candidate image frames into multiple cells, and defining, for the reference image frame and the candidate image frames, a plurality of sub-regions of the multiple cells. One or more of the sub-regions include the same cells for overlapping representations and the plurality of sub-regions include multiple sizes. The functions also comprise comparing characteristics of the plurality of sub-regions of the reference image frame to characteristics of the plurality of sub-regions of the candidate image frames and determining similarity measurements, and based on the similarity measurements, tracking the object within the sequence of video frames.

In still another example, a system is described comprising a camera to collect information of an environment of an vehicle and to output a sequence of video frames, and a processor to track an object within the sequence of video frames by determining, from the sequence of video frames, a reference image frame indicative of the object and candidate image frames representative of possible portions of the object, dividing the reference image frame and the candidate image frames into multiple cells, and defining, for the reference image frame and the candidate image frames, a plurality of sub-regions of the multiple cells. One or more of the sub-regions include the same cells for overlapping representations and the plurality of sub-regions include multiple sizes. The processor further tracks the object by comparing characteristics of the plurality of sub-regions of the reference image frame to characteristics of the plurality of sub-regions of the candidate image frames and determining similarity measurements, and based on the similarity measurements, tracking the object within the sequence of video frames.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 3A illustrates the example reference image frame of FIG. 1 that has been extracted from a video frame, according to an example embodiment.

FIG. 3B illustrates the reference image frame of FIG. 1 divided into a number of cells, according to an example embodiment.

FIG. 3C illustrates the example candidate image frame of FIG. 1 that has been extracted from a video frame, according to an example embodiment.

FIG. 3D illustrates the candidate image frame of FIG. 1 divided into a number of cells, according to an example embodiment.

FIG. 5A illustrates the reference image frame shown with a sub-region represented by the rectangle that includes a portion of the object according to an example embodiment.

FIG. 5B illustrates the candidate image frame shown with a sub-region represented by the rectangle that includes a portion of the object according to an example embodiment.

DETAILED DESCRIPTION

Figure 1:
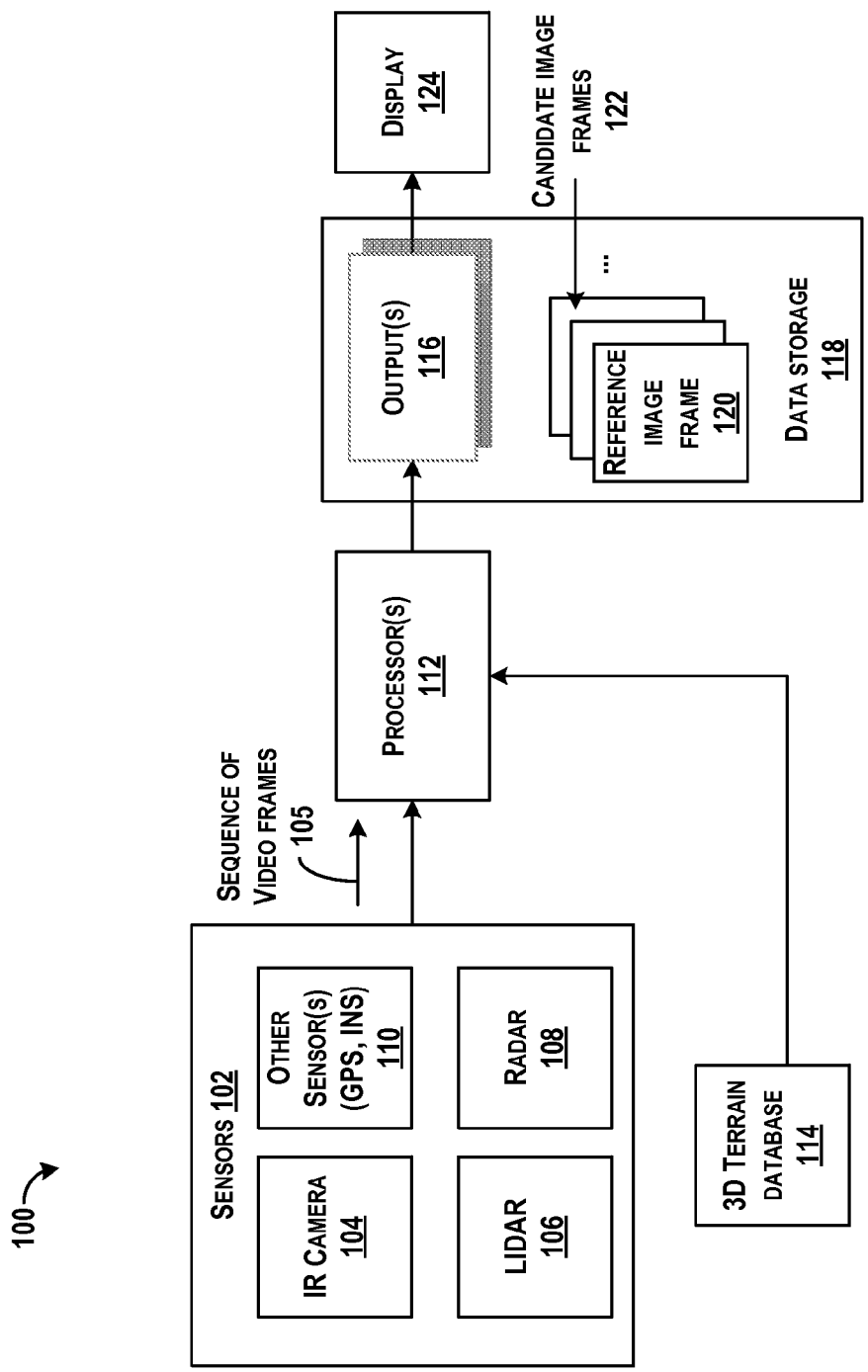
FIG. 1 is a block diagram of an example system for object tracking, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

In some instances, unmanned aerial vehicle (UAV) surveillance and target tracking missions requires persistent and robust target tracking/re-acquisition/re-identification. However, in urban environments, target loss situations may occur due to partial or total occlusion by buildings, bridges, or other landmarks. Targets may be tracked by analyzing a motion context of the target using assumption of linear or close to linear target trajectories, or using line segment features of the tracked objects. However, such tracking may be based on simple motion trajectories, such as on highways, and may not consider dynamic motions and also often does not take into account occlusions.

Within many environments, persistent target or object tracking such as by manned or UAV may require target reacquisition due to occlusion or partial occlusion of the object within a sequence of image frames. As used herein, an image frame is defined as a single image in a sequence of image frames or video, and an image includes a digital two-dimensional image comprising pixels organized into rows and columns. Each pixel may have a value representing a color and/or brightness for that pixel. Further, a sequence of image frames includes two or more images generated in a consecutive order with respect to time.

Within examples herein, a target signature model is described for robust tracking and reacquisition using multiple overlapped sub-regions of a selected image frame, which may be performed in real-time for onboard processing on the UAV. Example methods enable long term persistent target tracking and reacquisition using robust target signatures, which may be occlusion-robust target signatures based on overlapped sub-regions of selected image frames. Further examples may enable matching using sub-region based target signatures so as to disregard unwanted background information in the selected image frames. Using these methods, robust target reacquisition due to long term occlusion and reliable target identification under partial occlusion are described.

Within an example, a UAV may include an electro-optical (EO) or infrared camera that captures video of ground target(s), and processing is performed to determine distinguishable and consistent target signatures. Target loss can occur due to changes of illumination, partial/full occlusions, etc. in the video. To lower probabilities of target loss within a tracking system, sub-region matching between reference image frames and newly detected image frames of the target can be used based on statistical characteristics of luminance, chrominance, and respective entropies, to achieve reliable target matching and re-acquire a target lost due to occlusions or tracking failure. Target signature matching can be performed using cyclic sub-region matching and median of minimum or minimum of minimums matching between reference and candidate image frames that may have different occlusion patterns to track or reacquire identification of the target. Using sub-region matching effectively filters out occluded areas by selecting a variety of sub-regions to be matched between the reference and candidate image frames.

Referring now to the figures, FIG. 1 is a block diagram of an example system 100 for object tracking. The system 100 includes sensors 102, such as an infrared (IR) camera (or EO camera) 104, a LIDAR (light detection and ranging) 106, a RADAR (radio detection and ranging) 108, and possibly other sensors 110 that are in communication with a processor 112. The system 100 further includes a three-dimensional (3D) terrain database 114 also in communication with the processor 112. The processor 112 may receive inputs from the sensors 102 and the 3D terrain database 114, and process the inputs to generate outputs 116 that are stored in data storage 118. The data storage 118 may store a sequence of image frames 105 that include a reference image frame 120 representative of a frame of a video that includes an exemplar object, and one or more candidate image frames 122 of the video that are identified as possibly including portions of the object. The system 100 may further include a display 124 in communication with the data storage 118 and/or the processor 112 to receive and display the outputs 116.

The system 100 may be entirely within a vehicle or an aircraft, or portions of the system 100 may be on an aircraft (e.g., such as the sensors) and portions of the system may be elsewhere or located within other computing devices (e.g., such as the 3D terrain database).

The IR camera 104 may be a long wave IR camera configured to collect infrared information of an environment of a vehicle or aircraft, and to generate an image using the infrared information. Thus, the IR camera 104 may collect information of the environment of the vehicle and output a sequence of video frames 105, for example, to the processor 112. Other types of cameras may be alternatively or additionally included, such as an EO camera.

The LIDAR 106 can estimate distance to environmental features while scanning through a scene to assemble a "point cloud" indicative of reflective surfaces in the environment. Individual points in the point cloud can be determined by transmitting a laser pulse and detecting a returning pulse, if any, reflected from any object in the environment, and then determining a distance to the object according to a time delay between the transmitted pulse and reception of the reflected pulse. A laser, or set of lasers, can be rapidly and repeatedly scanned across portions of the environment to generate continuous real-time information on distances to reflective objects in the environment. Combining measured distances and orientation of the laser(s) while measuring each distance allows for associating a three-dimensional position with each returning pulse. In this way, a three-dimensional map of points (e.g., a point cloud) indicative of locations of reflective features in the environment can be generated for the entire scanning zone. The LIDAR 106 may output point cloud data, or may output images generated using point cloud data, for example. Thus, the LIDAR can be configured to collect laser point cloud data of the environment of the vehicle.

The RADAR 108 is an object-detection sensor that uses radio waves to determine range, altitude, direction, or speed of objects in an environment. For example, the RADAR may include an antenna that transmits pulses of radio waves or microwaves that bounce off any object in their path. The object returns a portion of the waves energy to a receiver of the RADAR for estimation or determination of positioning of the object.

The other sensor(s) 110 may include a variety of sensors included on the vehicle for navigational purposes, such as other imaging cameras, inertial measurement units (IMUs), temperature sensors, SONAR, or any other array of sensors and optical components. In some examples, the sensors 110 may include an inertial navigation system (INS) configured to determine navigation information of the vehicle, a global positioning system (GPS) for determining navigation information as well, or other navigation system.

The 3D terrain database 114 may store terrain images captured by a camera on the vehicle to generate visual representations of the environment of the vehicle.

The processor 112 may receive inputs from the sensors 102 to track objects over time as seen in the inputs. Thus, the processor 112 may track objects within a video feed output by the IR camera 104 in real-time while the vehicle is traversing the environment, based on inputs from the IR camera 104, the LIDAR 106, the RADAR 108 and the sensors 110, for example. To do so, in one example, the processor 112 may extract, from the video 105, a reference image frame 120 indicative of, or including the object and candidate image frames 122 representative of possible portions of the object, divide the reference image frame 120 and the candidate image frames 122 into multiple cells, and compare characteristics of the reference image frame 120 to characteristics of the candidate image frames 122 for determination of similarity measurements. The processor 112 may store the reference image frame 120 and the candidate image frames 122 in the data storage 118. The similarity measurements can be used to track the object within the sequence of video frames.

Terrain images from the 3D terrain database 114 may be overlaid onto the video feed to generate the outputs 116 for storage in the data storage 118 and for display.

The outputs 116 may include a number of various forms including a video feed that tracks a target object, or data representative of the target object location in the environment over time. The outputs 116 can be sent to the display 124, which may include both multi-function displays (MFD) and head mounted displays (HMD), permitting aircrews to view the outputs. The display 124 may include other displays of a vehicle as well. As an example, the outputs 116 may be displayed on the display 124 to highlight the target object being tracked over time within the sequence of video frames.

The system 100 may be configured to receive inputs from the sensors 102 that include data representative of moving objects in an environment, and process the inputs to track the objects over time. As an example, the system 100 may be present on a vehicle (e.g., a UAV) that travels through an environment capturing a video feed of the environment and any moving objects in the environment. The IR camera 104 may provide the sequence of video frames 105 of the environment with the moving objects, and the processor 112 may process the sequence of video frames 105 to track the moving objects over time with respect to a location of the object within the sequence of video frames 105, which may be mapped to a physical geographic location of the object in the environment.

Persistent target tracking can be performed so as to track the object even when the object is occluded by features of the environment, and thus, the processor 112 may perform target reacquisition from long term occlusions or partial occlusions in real-time. As an example, when a UAV system with an EO or IR camera tracks ground target(s), distinguishable and consistent target signatures can be used for the system 100 to reacquire and track lost target(s). Target loss occurs usually due to sudden changes of illumination, partial/full occlusions, etc. The system 100 may perform sub-region matching between reference image frames and newly detected image frames (e.g., portions of image frames) using statistical characteristics of luminance, chrominance, and their entropies, to achieve reliable target matching and reacquisition due to targets lost because of occlusions or tracking failure. In other examples, to track the object, the processor 112 determines a signature for a reference image frame of the target object using multiple overlapped sub-regions of the reference image frame for comparison with signatures of newly detected image frames using cyclic sub-region matching, or median/minimum of minimums between reference and candidate image frames that may have different occlusion patterns.

The processing of data may be performed on a computing device separate from the system 100, or processing may be performed onboard the system (e.g., onboard the UAV) to enhance capabilities for autonomous operations and UAV surveillance.

Figure 2:
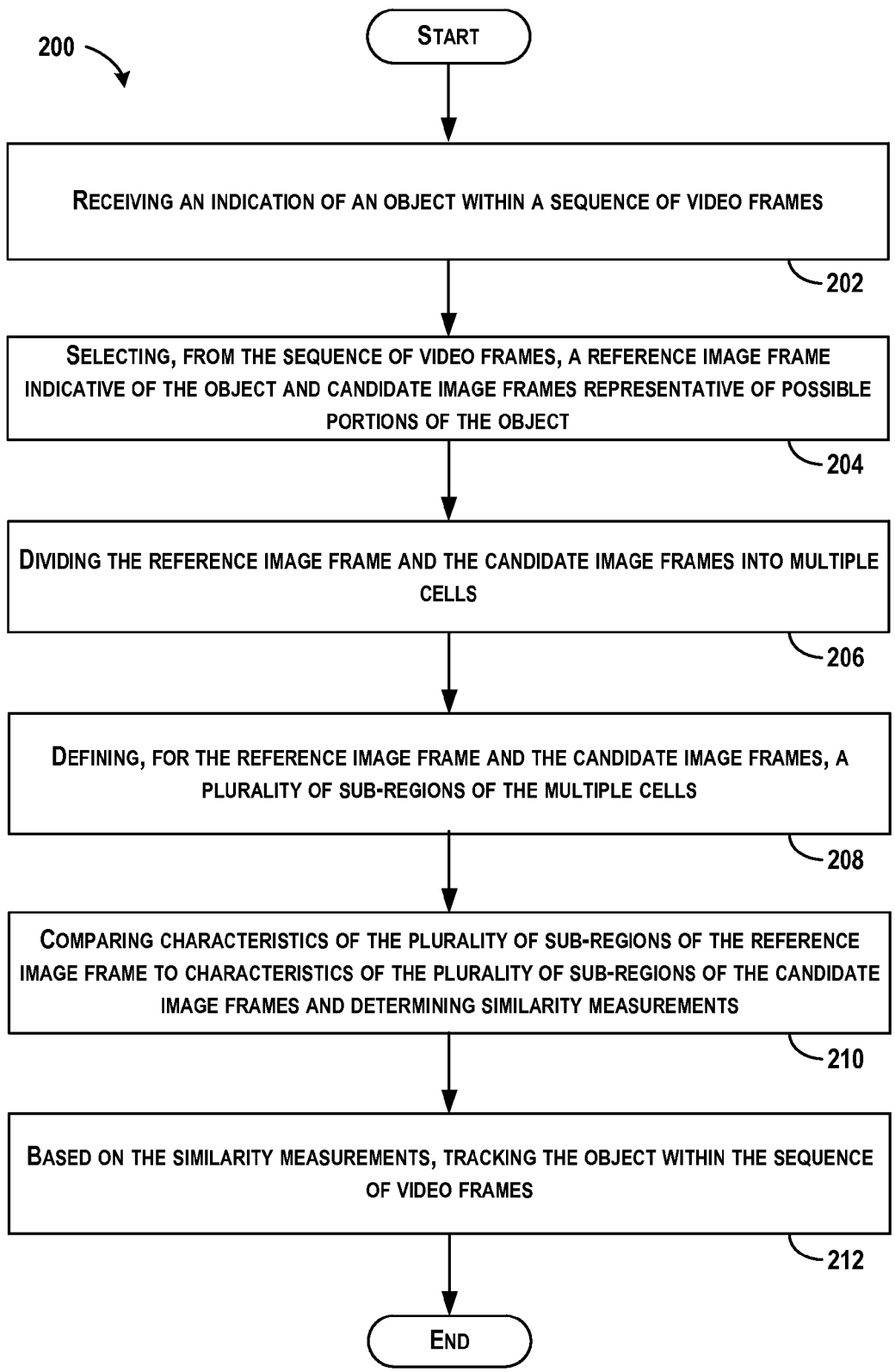
FIG. 2 shows a flowchart of an example method for occlusion-robust visual object fingerprinting using fusion of multiple sub-region signatures, according to an example embodiment.

FIG. 2 shows a flowchart of an example method 200 for occlusion-robust visual object fingerprinting using fusion of multiple sub-region signatures, according to an example embodiment. Method 200 shown in FIG. 2 presents an embodiment of a method that could be used with the system shown in FIG. 1, for example, and may be performed by a computing device (or components of a computing device) such as a client device or a server or may be performed by components of both a client device and a server. Example devices or systems may be used or configured to perform logical functions presented in FIG. 2. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 2 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving an indication of an object within the sequence of video frames 105. The sequence of video frames 105 may be output by the camera 104 and received by a computing device or the processor 112. It may be desired to track an object within the sequence of video frames. Visual object tracking can thus be performed to track a ground target/object within a video sequence, and once an object for tracking is chosen or determined, the object can be followed within the video sequence. A specific object for tracking can be determined by a user selecting or designating the object or by other manners resulting in receipt of an input or indication indicating the object.

In some examples, rather than manually selecting an object in a scene or frame for tracking, the method 200 may include detecting a moving object in the sequence of video frames as the object for tracking. Moving object detection may be performed in a number of ways, such as by frame-by-frame comparison to determine differences between frames and drawing bounding boxes around areas that have differences. Areas without differences (or differences less than a threshold) may be determined to be background (e.g., portions of frames that include little or no movement). Areas with differences above a threshold likely include moving objects, and such areas can be identified and noted as including objects of interest for tracking.

In another example, moving object detection can be performed with a moving object detection method that takes into account jittering/vibration when the videos contain image motion due to platform motion. To detect salient or independently moving ground objects in these videos, the video images can be stabilized frame by frame so that stationary backgrounds remain fixed in the image. The video are stabilized by registering image frames to a certain global coordinate system, and then videos of the scene appear stable with respect to a ground plane and other environmental structures fixed in the image so that independently moving objects such as ground vehicles appear as moving objects in the video. Feature correspondence matching can be used to compare sets of features and match key points from one image frame to others that have similar features. A set of matching points from two images can be generated, and processed using minimum Euclidean distances, for example, resulting in matching features that are indicative of moving objects in the video.

At block 204, the method 200 includes selecting, from the sequence of video frames 105, a reference image frame, frame 120 for example, indicative of the object and one or more candidate image frames, frames 122 for example, representative of possible portions of the object. Once an object is designated, using, for example, the moving object detection method described above, a reference image frame of the object in the video is selected or extracted as a target signature for tracking or target reacquisition. A target signature, for example, is a representation of an appearance and shape of a target of interest (e.g., vehicle, pedestrian) in an image frame to be used for matching/comparison with other signatures collected. The reference image frame can be manually selected/extracted/identified from the video, or using the moving object detection methods, an image frame can be extracted that includes an ideal representation of the object (e.g., an image frame that illustrates the object with little or no occlusions).

Candidate image frames may be representative of possible portions of the object, such as video frames that include portions of the object occluded by another object. Candidate image frames can also be identified within the video frames using the moving object detection methods where feature comparisons between frames indicate matches of at least some features so that the candidate image frames contain at least a portion of the object.

At block 206, the method 200 includes dividing the reference image frame 120 and the candidate image frames 122 into multiple cells. A cell may be a smaller portion of the image frame. Each cell contains a certain number of pixels representing partial appearance information of the object. Depending on the image frame size, the size of a cell and a number of cells can vary.

FIG. 3A illustrates the example reference image frame 120, showing an object 302 (e.g., a car), that has been extracted from a video or the sequence of video frames 105. The reference image frame 120 is a portion of video or the sequence of video frames 105 (shown in FIG. 1). In this example, the object 302 is a car. FIG. 3B illustrates the reference image frame 120 divided into a number of cells 304. In this example, the number of cells 304 is 25 cells. In this example, the size of the reference image frame 120 is approximately 25×40 pixels, and by dividing the reference image frame 120 into 25 (5×5) cells, each cell size becomes 5×8 pixels. Each cell represents part of the reference image frame 120.

FIG. 3C illustrates the example candidate image frame 122 showing the object 302 that has been extracted from the sequence of video frames 105. The candidate image frame 122 illustrates the object 302 occluded by an occlusion 312 (e.g., the car driving under a bridge). FIG. 3B illustrates the candidate image frame 122 divided into a number of cells 304. In this example, the number of cells 304 is 25 cells.

Figure 4A:
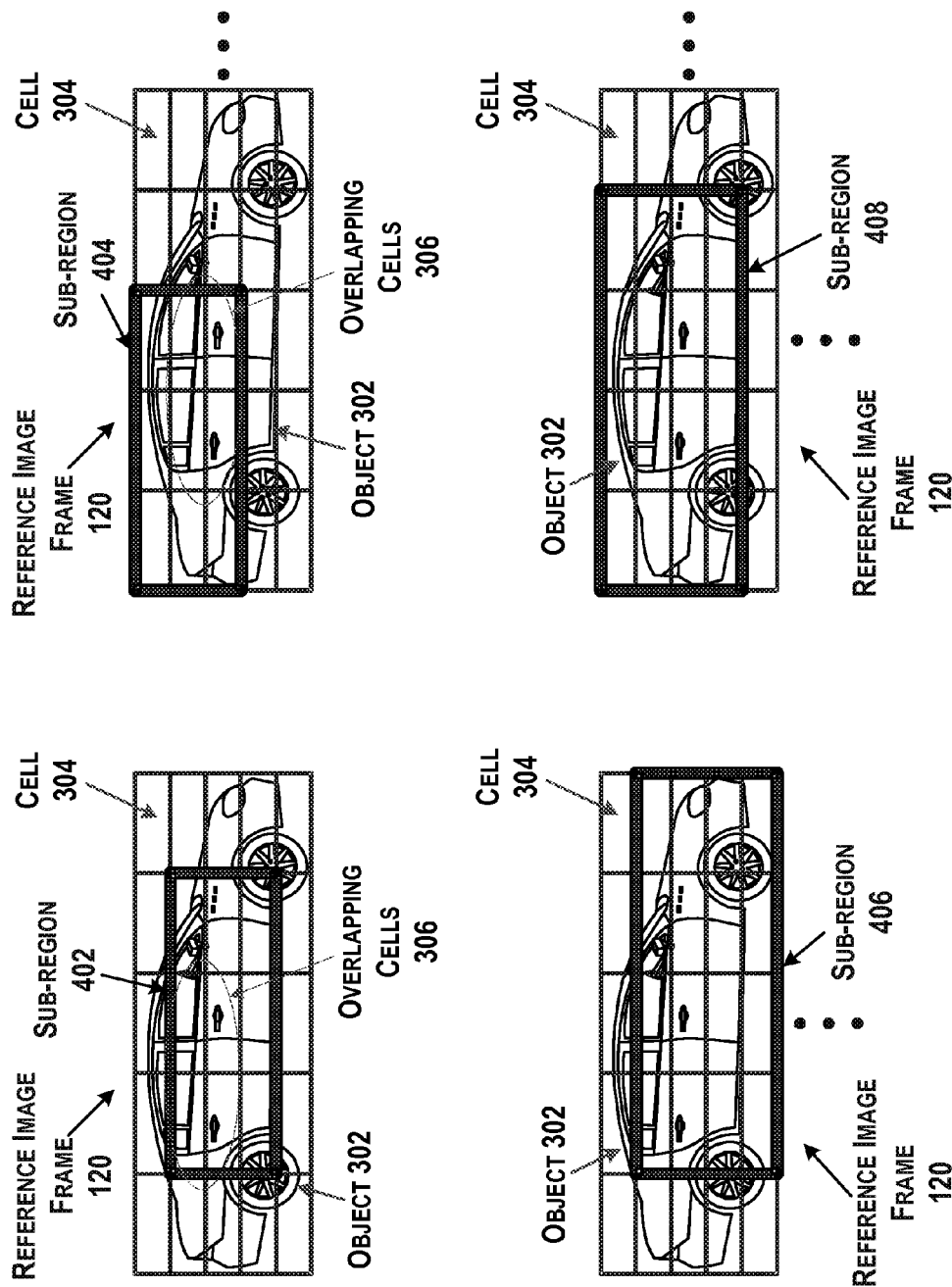
FIG. 4A illustrates examples of sub-regions defined for the reference image frame, according to an example embodiment.
Figure 4B:
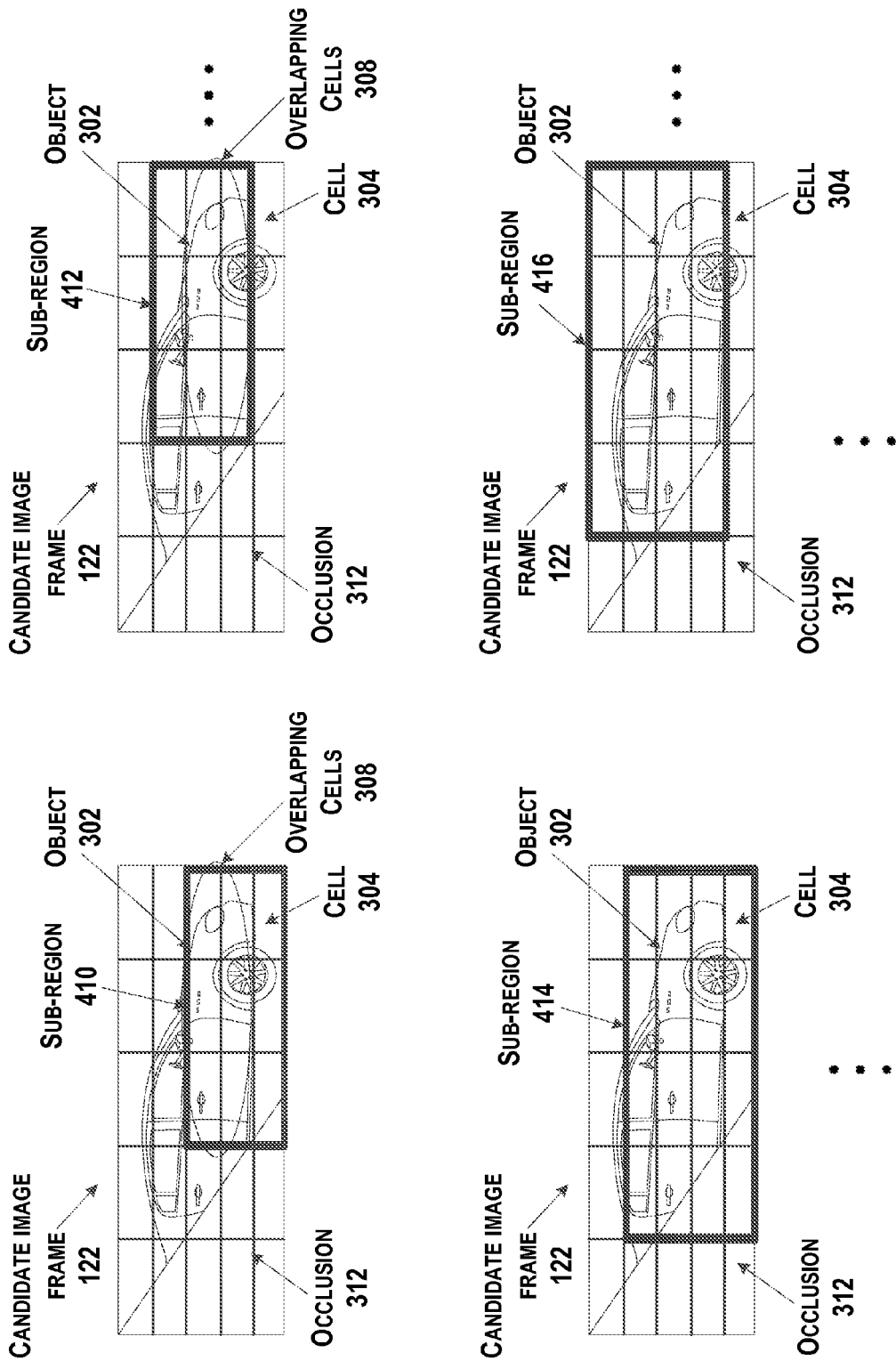
FIG. 4B illustrates examples of sub-regions defined for the candidate image frame, according to an example embodiment.

Referring back to FIG. 2, at block 208, the method 200 includes defining, for the reference image frame 120 and the candidate image frames 122, a plurality of sub-regions 402, 404, 406, and 408 (as shown in FIG. 4A) for the reference image frame 120 and a plurality of sub-regions 410, 412, 414, and 416 (as shown in FIG. 4B) for the candidate image frame 122, and each sub-region 402-408 and 410-416 includes multiple cells 304. One or more of the sub-regions 402-408 and 410-416 include the same cells for overlapping cells 306 or overlapping representations and the plurality of sub-regions include multiple sizes.

Using the method 200, the candidate image frames 122 are compared to the reference image frame 120 to track the object 302 throughout the video. However, depending on various conditions such as a location (center, left, or right) and size of the object/target within the image frame, viewpoints (view angles) toward the target, or existence of occlusions and clutters, it may not be guaranteed to have cell-to-cell matching correspondence among different image frames of the same target. To make target signature matching robust, multiple sub-regions are assigned in overlapped and multiple-sized ways. An example purpose of overlapping is to include the same features in many sub-regions, and an example purpose of multiple-sizes is to consider that an effective number of cells in a sub-region varies due to background inclusion or partial occlusion in the image frame.

FIG. 4A illustrates examples of sub-regions that may be defined for the reference image frame 120. The top row shows the reference image frame 120 with example sub-regions 402 and 404 of 3×3 cells and the bottom row shows example sub-regions 406 and 408 of 4×4 cells. To create the various overlapping sub-regions, after a size is chosen, sub-regions can be generated from a left-top corner of the image frame down to a right-bottom corner by shifting the 3×3 bounding box over and down one cell at a time. For example, as shown in FIG. 4A, the overlapping cells 306 are both included in the sub-region 402 and in the sub-region 404. Using a 3×3 sub-region size may result in 9 different sub-regions and using a 4×4 sub-region size may result in 4 different sub-regions for a 25 cell image frame. This way, sub-regions are generated to be overlapping and of multiple sizes. Not all possible different sub-regions of overlapping and possible sub-regions of multiple sizes need to be generated. More overlapping and size variation can result in more robust matching.

FIG. 4B illustrates examples of sub-regions that may be defined for the candidate image frame 122. The candidate image frame 122 shows the object 302 occluded by portions of environment (e.g., car drives under bridge and an occlusion 312 exists). The top row shows the candidate image frame 122 with example sub-regions 410 and 412 of 3×3 cells and the bottom row shows example sub-regions 414 and 416 of 4×4 cells. To create the various overlapping sub-regions, after a size is chosen, sub-regions can be generated from a left-top corner of the image frame down to a to right-bottom corner by shifting the 3×3 bounding box over and down one cell at a time. For example, as shown in FIG. 4B, the overlapping cells 308 are both included in the sub-region 410 and the sub-region 412. Using a 3×3 sub-region size may result in 9 different sub-regions and using a 4×4 sub-region size may result in 4 different sub-regions for a 25 cell image frame. This way, sub-regions are generated to be overlapping and of multiple sizes. Not all possible different sub-regions of overlapping and possible sub-regions of multiple sizes need to be generated. More overlapping and size variation can result in more robust matching.

Thus, both of the reference image frame 120 and the candidate image frames 122 are divided into multiple cells 304. Multiple cells 304 may then be grouped together to form sub-regions, such as for example, the sub-regions 402, 404, 406, and 408 shown in FIG. 4A and sub-regions 410, 412, 414, and 416 shown in FIG. 4B.

Referring back to FIG. 2, at block 210, the method 200 includes comparing characteristics of the plurality of sub-regions of the reference image frame 120 to characteristics of the plurality of sub-regions of the candidate image frames 122 and determining similarity measurements.

As one example, for each sub-region, a fingerprint signature is calculated by extracting unique features of the sub-regions for comparison to determine if the object (or portion of object) is present in both the reference and candidate image frames. An example fingerprint signature vector f contains the following information (in YCbCr color space) of pixels in an image frame: Luminance mean value $L_{mean}$, Red chrominance mean value $Cr_{mean}$, Blue chrominance mean value $Cb_{mean}$, Luminance entropy $L_{ent}$, Red chrominance entropy $Cr_{ent}$, and/or Blue chrominance entropy $Cb_{ent}$. Alternatively or additionally, besides the mean-entropy vector, its covariance matrix, C, can be estimated such that each sub-region has a fingerprint pair, {f, C}.

FIGS. 5A-5B illustrate example sub-region comparisons. In FIG. 5A, the reference image frame 120 is shown with the sub-region 406 represented by the rectangle that includes a portion of the object 302. FIG. 5B is the candidate image frame 122 that includes the sub-region 414 represented by the rectangle. The candidate image frame 122 shows the object 302 occluded by portions of environment (e.g., car drives under bridge and the occlusion 312 exists). The example in FIGS. 5A-5B show that the sub-region 406 matches to the sub-region 414. However, for other sub-regions of the candidate image frame 122 in FIG. 5B, no match may have been determined due to the occlusion 312. In this example, sub-region matching can identify matches when different overlapping and multiple-sized sub-regions of the reference image frame 120 are used for comparison with sub-regions that can be generated from the candidate image frame 122. Thus, sub-region matching is performed in a manner to consider a number of occlusion patterns of the object within the given candidate image frame.

Referring back to FIG. 2, after comparing sub-regions 406 and 414, similarity measurements are determined. Sub-region comparisons may include comparing respective fingerprint signatures of the reference image frame 120 to respective fingerprint signatures of the candidate image frames 122, and determining similarity measurements based on a Kullback-Leibler Distance (KLD). The KLD similarity measurement may be used as an indication of a match, and a lower/shorter distance indicates a better match. A threshold distance may be satisfied to determine a match.

Figure 6:
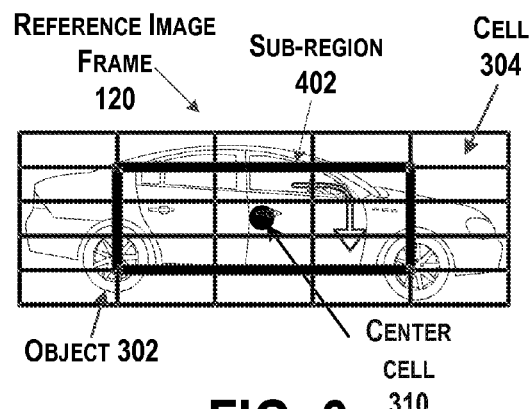
FIG. 6 illustrates the example 3×3 sub-region of the reference image frame 120 that can be rotated around the center cell resulting in a plurality of different combinations of sub-regions, according to an example embodiment.

In some examples, for a given comparison of sub-regions of the reference image frame 120 to the candidate image frame 122, matching can be performed in a cyclic manner. FIG. 6 illustrates the example 3×3 sub-region 402 of the reference image frame 120 that can be rotated around a center cell 310 so as to rotate sub-regions around the center cell 310 resulting in a plurality of different combinations of sub-regions. The same may be performed for the candidate image frames 122 resulting in a plurality of different combinations of pairs of sub-regions between the reference image frame 120 and the candidate image frames 122, and similarity measurements for the combinations of sub-region pairs are determined. A given candidate image frame with a minimum of similarity measurements may be determined as a best match for tracking purposes.

Cyclic matching may be useful for candidate image frames where a target itself rotates or turns, or when a sensing platform (on the UAV) changes viewpoints. Here, sub-region matching is performed by taking the rotation effects in consideration. In an example in which a number of sub-regions is fixed as nine (e.g., one center sub-region and eight rotating sub-regions around the center sub-region as partially illustrated in FIG. 4), then using cyclic matching, there will be eight different combinations of sub-region pairs between two different image frames.

Since a signature value for each sub-region represents a local signature and it is matched to a corresponding signature in the other image frame (but with any possible rotations), cycle sub-region matching can show more robust target matching for cases of partial occlusion and rotation effects being present.

The KLD similarity measurement for each signature pair (e.g., mean vector of luminance/chrominance/entropies and their corresponding covariance matrices) is determined. As an example, for the KLD value between an image frame i and an image frame j, the following equation is used:

$$KLD^{i|j} = \log\left(\frac{det(C^i)}{det(C^j)}\right) + trace((C^i)^{-1}C^j) + (f^i - f^j)(C^i)^{-1}(f^i - f^j)^T \quad \text{Equation [1]}$$

where $f^i$ and $f^j$ are mean-entropy vectors of the image frame i and the image frame j, respectively, and $C^i$ and $C^j$ are the corresponding covariance matrices. Since KLD is not symmetrical, then $KLD^{j|i}$ is also calculated and an average between $KLD^{j|i}$ and $KLD^{i|j}$ is determined.

So, the signature pair $\{f_T, C_T\}$ for the reference image frame and $\{f_K,\}$ for the $K^{th}$ candidate image frame are compared with calculating each sub-KLD, $KLD_{T,K}^{i,j}$ between the $i^{th}$ sub-signature pair, $\{f_T^i, C_T^i\}$, and the $j^{th}$ sub-signature pair $\{f_K^i, C_K^i\}$ as shown below:

$$KLD_{T,K}^{i,j} = 0.5*(KLD_{T|K}^{i|j} + KLD_{K|T}^{j|i}) \quad \text{Equation [2]}$$

where:

$$KLD_{T|K}^{i|j} = \log\left(\frac{det(C_T^i)}{det(C_K^j)}\right) + trace((C_T^i)^{-1}C_K^j) + (f_T^i - f_K^j)(C_T^i)^{-1}(f_T^i - f_K^j)^T \quad \text{Equation [3]}$$

As mentioned earlier, for each comparison, there are eight different combinations and those KLDs are calculated by fixing the center cell and rotating the other cells in one direction, as in FIG. 7, resulting in the following KLD measurements:

$$kld_1 = [KLdist(FP_0^j, FP_0^0) - KLdist(FP_1^j, F_1^0) + KLdist(FP_2^j, FP_2^0) + \ldots + KLdist(FP_8^j, FP_8^0)]$$

$$kld_2 = [KLdist(FP_0^j, FP_0^0) - KLdist(FP_2^j, F_1^0) + KLdist(FP_3^j, FP_2^0) + \ldots + KLdist(FP_1^j, FP_8^0)]$$

$$kld_8 = [KLdist(FP_0^j, FP_0^0) - KLdist(FP_8^j, F_1^0) + KLdist(FP_1^j, FP_2^0) + \ldots + KLdist(FP_7^j, FP_8^0)] \quad \text{Equation [4]}$$

An initial clause of the KLD measurements $\{KLdist(FP_0^j, FP_0^0)\}$ is always the same, and remaining portions of the KLD measurements are due to the cyclic rotation to compare all different orientations.

Finally, a resulting KLD for a best candidate image frame "T" is as follow $$KLD_T = \min_k(\Sigma_i \Sigma_j \{KLD_{T,K}^{i,j,k}\}) \quad \text{Equation [5]}$$

In other examples, for a given comparison of sub-regions of the reference image 120 frame to the candidate image frame 122, matching can be performed by determining median of a minimum or a minimum of a minimum of the similarity measurements of the candidate image frame 122.

For median of minimum matching, one sub-region matching that presents the best fit is effectively chosen. For each sub-region i in the image frame T, $KLD_{T,K}^{i,j}$ is obtained with the sub-region j in the image frame K. To obtain the best match for the sub-region i in T, a minimum $KLD_{T,K}^{i,j}$ over j's is estimated. Then over i's, a median of $KLD_{T,K}^{i}$'s is determined. Then a final KLD value for image frame T with candidate K will be as follows:

$$KLD_{T,K} = median_i(min_j(\{KLD_{T,K}^{i,j}\})) \quad \text{Equation [6]}$$

An image frame that has a minimum value among $KLD_{T,K}$'s is then chosen as the best match.

A minimum of minimum matching can be used when large amounts of occlusion are expected. Therefore, unless small amounts of partial occlusions are expected, for minimum of the minimum method is used with minimums of $KLD_{T,K}^{i}$'s. Choosing the minimum will likely provide a higher chance to be free from partial occlusions compared to choosing the median of $KLD_{T,K}^{i}$'s. In this example, a final $KLD_{T,K}$ is estimated as follows:

$$KLD_{T,K} = min_i(min_j(\{KLD_{T,K}^{i,j}\})) \quad \text{Equation [7]}$$

Referring back to FIG. 2, at block 212, the method 200 includes based on the similarity measurements, tracking the object 302 within the sequence of video frames 105. Tracking the object 302 within the sequence of video frames 105 includes determining matches between the candidate image frames 122 and the reference image frame 120, and based on mis-matches between the candidate image frames 122 and the reference image frame 120 within a portion of the sequence of video frames 105 target reacquisition within a subsequent portion of the sequence of video frames 105 is performed.

In summary, examples of the method 200 may include storing a reference image frame's fingerprint pairs $\{f_T^i, C_T^i\}$ after the object 302 is selected, detecting moving target candidates, assigning each detected object into a candidate image frame, and for each image frame dividing it into cells (e.g., 5×5 cells in one image frame) and assigning sub-regions (e.g., 3×3 cells or 4×4 cells). For each pair between a $i^{th}$ sub-region of a $K^{th}$ candidate image frame and an $i^{th}$ sub-region of the reference image frame T, $KLD_{T,K}^{i,j}$ is calculated, and a candidate with a minimum of cyclic/minimum of median/minimum of minimum KLDs with the reference image frame is determined to track the object between frames of a video.

Example tests were performed and a comparison of test results with random occlusion rates were determined using matching methods of (1) an entire image frame method (uses the entire area of the extracted image frame and only one KLD value), (2) the cyclic sub-region method (uses sub-regions in a cyclic way), (3) the median of the minimum of the overlapped multiple sub-region method (uses multiple overlapped sub-regions and selects the median of the minimum KLD values), and (4) the minimum of the minimum of the overlapped multiple sub-region method (uses multiple overlapped sub-regions and selects the minimum of the minimum KLD values).

In the example tests, sixty vehicle image frames of four different vehicles were selected and artificially occluded by background image frames. Partial occlusion rates were randomly selected in 15%-25% and in a random portion of the image frame. Tables 1-4 below present test results. In the tables, "Occ V#" is the occluded vehicle type and "V#" is an original vehicle image frame in the same category. The original image frame itself was not compared with its own occluded image frame. The "Background" indicates nonvehicle image frames. As shown in the tables, all sub-region based methods outperformed the previous entire image frame method, and the minimum of the minimum method was shown to be the most accurate in this test.

TABLE 1

The entire image frame method (Average correctness: 81.67%)

|  | V1 | V2 | V3 | V4 | Background |
|---|---|---|---|---|---|
| Occ V1 | 0.786 | 0.071 | 0 | 0 | 0.143 |
| Occ V2 | 0.077 | 0.769 | 0 | 0 | 0.154 |
| Occ V3 | 0 | 0 | 0.375 | 0.625 | 0 |
| Occ V4 | 0 | 0 | 0 | 1.000 | 0 |

TABLE 2

The cyclic subregion method (Average correctness: 91.67%)

|  | V1 | V2 | V3 | V4 | Background |
|---|---|---|---|---|---|
| Occ V1 | 0.929 | 0 | 0 | 0.071 | 0 |
| Occ V2 | 0.077 | 0.769 | 0 | 0.154 | 0 |
| Occ V3 | 0 | 0 | 0.875 | 0.125 | 0 |
| Occ V4 | 0 | 0 | 0 | 1.000 | 0 |

TABLE 3

The median of the minimum method (Average correctness: 86.67%)

|  | V1 | V2 | V3 | V4 | Background |
|---|---|---|---|---|---|
| Occ V1 | 0.786 | 0.071 | 0 | 0 | 0.143 |
| Occ V2 | 0 | 0.692 | 0.077 | 0.154 | 0.077 |
| Occ V3 | 0 | 0 | 0.875 | 0.125 | 0 |
| Occ V4 | 0 | 0 | 0 | 1.000 | 0 |

TABLE 4

The minimum of the minimum method (Average correctness: 96.67%)

|  | V1 | V2 | V3 | V4 | Background |
|---|---|---|---|---|---|
| Occ V1 | 1.000 | 0 | 0 | 0 | 0 |
| Occ V2 | 0 | 0.846 | 0 | 0.077 | 0.077 |
| Occ V3 | 0 | 0 | 1.000 | 0 | 0 |
| Occ V4 | 0 | 0 | 0 | 1.000 | 0 |

Similar tests were performed for a comparison test with fixed occlusion rates. In this test, 2641 vehicle image frames with 46 different vehicles were used. Occlusion was applied using 215 background image frames, and occlusion rates were selected as 0%, 12.5%, 25%, 33%, and 50% for each test. Though occlusion rates are fixed for each test, occlusion locations were randomly assigned. Sizes of sub-regions were selected as 45% and 65% of each entire image frame.

Figure 7:
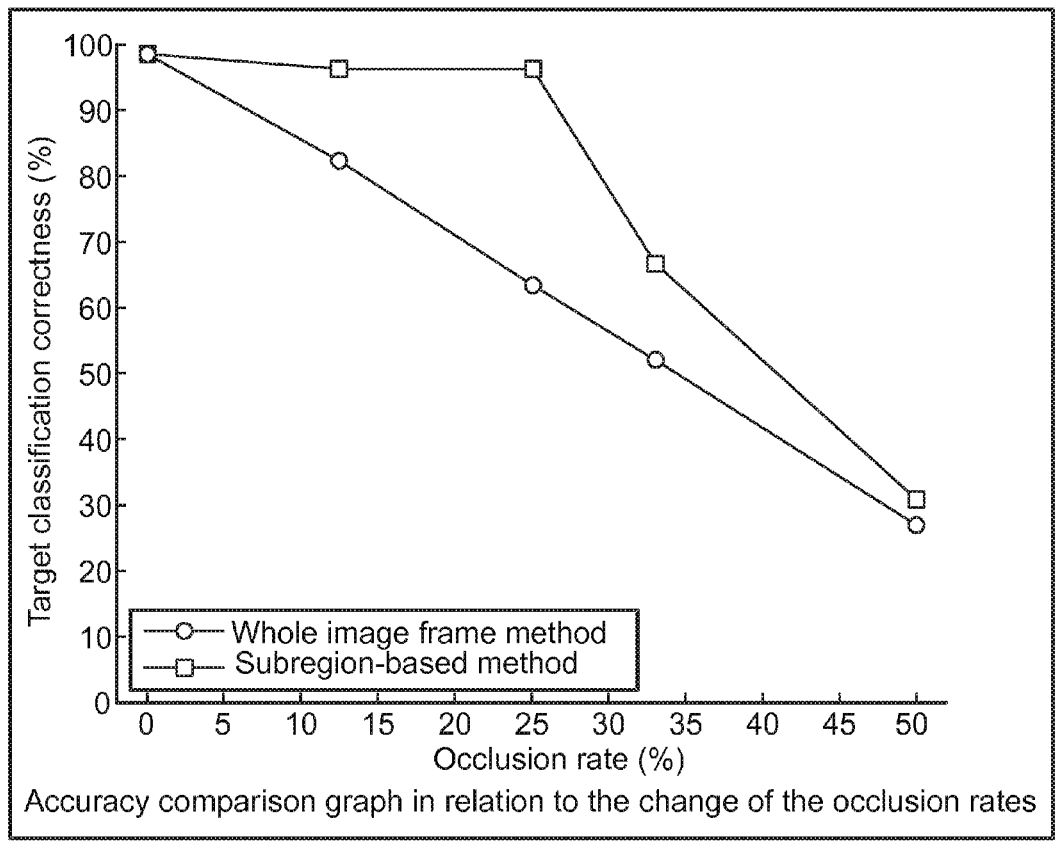
FIG. 7 is an example target classification accuracy graph between the entire image frame method and the sub-region method, according to an example embodiment.

FIG. 7 is an example target classification accuracy graph between the entire image frame method and the sub-region method (e.g., minimum of the minimum method was used in this test). Over all the ranges (0% through 50%), the sub-region method provided better performance. Up to 25%, the sub-region method rarely shows a decrease of accuracy, and after 33%, both the methods decrease because 33% occlusion in the image frame can be more than 50% occlusion of the target itself in some examples. If occlusion is more than 50%, target matching becomes difficult.

Figure 8:
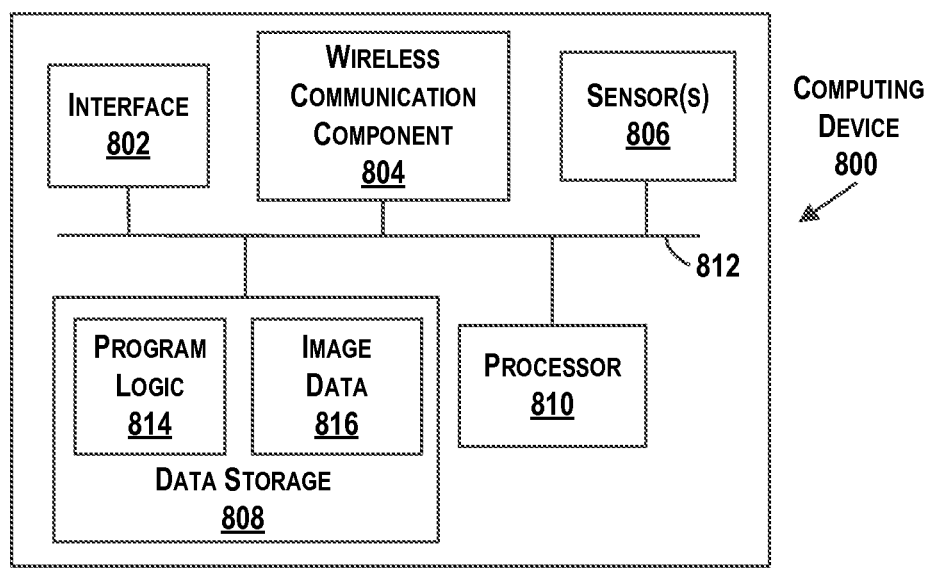
FIG. 8 illustrates a schematic drawing of an example computing device, according to an example embodiment.

As mentioned, portions of any of the methods described herein (e.g., the method 200) may be performed by a computing device (or components of a computing device), as well as by components of elements shown in FIG. 1. FIG. 8 illustrates a schematic drawing of an example computing device 800. The computing device 800 in FIG. 8 may represent devices shown in FIG. 1 including the processors, the system, or any of the blocks conceptually illustrating computing components, or the computing device 800 may represent the system in FIG. 1 in general. In some examples, some components illustrated in FIG. 8 may be distributed across multiple computing devices. However, for the sake of example, the components are shown and described as part of one example device 800. The computing device 800 may be or include a mobile device, desktop computer, email/messaging device, tablet computer, or similar device that may be configured to perform the functions described herein.

The computing device 800 may include an interface 802, a wireless communication component 804, sensor(s) 806, data storage 808, and a processor 810. Components illustrated in FIG. 8 may be linked together by a communication link 812. The computing device 800 may also include hardware to enable communication within the computing device 800 and between the computing device 800 and another computing device (not shown), such as a server entity. The hardware may include transmitters, receivers, and antennas, for example.

The interface 802 may be configured to allow the computing device 800 to communicate with another computing device (not shown), such as a server. Thus, the interface 802 may be configured to receive input data from one or more computing devices, and may also be configured to send output data to the one or more computing devices. In some examples, the interface 802 may also maintain and manage records of data received and sent by the computing device 800. The interface 802 may also include a receiver and transmitter to receive and send data. In other examples, the interface 802 may also include a user-interface, such as a keyboard, microphone, touchscreen, etc., to receive inputs as well.

The wireless communication component 804 may be a communication interface that is configured to facilitate wireless data communication for the computing device 800 according to one or more wireless communication standards. For example, the wireless communication component 804 may include a Wi-Fi communication component that is configured to facilitate wireless data communication according to one or more IEEE 802.11 standards. As another example, the wireless communication component 804 may include a Bluetooth communication component that is configured to facilitate wireless data communication according to one or more Bluetooth standards. Other examples are also possible.

The sensor 806 may include one or more sensors, or may represent one or more sensors included within the computing device 800. Example sensors include an accelerometer, gyroscope, pedometer, light sensors, microphone, camera, or other location and/or context-aware sensors.

The data storage 808 may store program logic 814 that can be accessed and executed by the processor 810. The data storage 808 may also store collected sensor data or image data 816.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
receiving an indication of an object within a sequence of video frames;
selecting, from the sequence of video frames, a reference image frame indicative of the object and candidate image frames representative of possible portions of the object;
dividing the reference image frame and the candidate image frames into multiple cells;
defining, for the reference image frame and the candidate image frames, a plurality of sub-regions of the multiple cells, wherein one or more of the sub-regions include the same cells for overlapping representations and wherein the plurality of sub-regions include multiple sizes;
comparing characteristics of the plurality of sub-regions of the reference image frame to characteristics of the plurality of sub-regions of the candidate image frames and determining similarity measurements; and
based on the similarity measurements, tracking the object within the sequence of video frames.

2. The method of claim 1, wherein receiving the indication of the object within the sequence of video frames comprises detecting a moving object in the sequence of video frames.

3. The method of claim 1, wherein selecting, from the sequence of video frames, the candidate image frames representative of possible portions of the object comprises extracting portions of the object occluded by another object.

4. The method of claim 1, further comprising:
determining fingerprint signatures for the plurality of sub-regions for the candidate image frames and the reference image frame; and
wherein comparing the characteristics of the plurality of sub-regions of the reference image frame to the characteristics of the plurality of sub-regions of the candidate image frames and determining similarity measurements comprises:
comparing respective fingerprint signatures of the reference image frame to respective fingerprint signatures of the candidate image frames.

5. The method of claim 4, wherein determining the fingerprint signatures for the plurality of sub-regions for the candidate image frames and the reference image frame comprises:
determining a representation of an appearance and a shape of the object based on one or more of statistical characteristics of luminance, chrominance, entropy of luminance and entropy of chrominance for a given image frame.

6. The method of claim 1, wherein tracking the object within the sequence of video frames comprises:
determining matches between the candidate image frames and the reference image frame.

7. The method of claim 6, wherein based on mis-matches between the candidate image frames and the reference image frame within a portion of the sequence of video frames, the method further comprises:
performing target reacquisition within a subsequent portion of the sequence of video frames.

8. The method of claim 1, wherein comparing characteristics of the plurality of sub-regions of the reference image frame to characteristics of the plurality of sub-regions of the candidate image frames and determining similarity measurements comprises:
determining the similarity measurements based on a Kullback-Leibler distance.

9. The method of claim 1, wherein comparing characteristics of the plurality of sub-regions of the reference image frame to characteristics of the plurality of sub-regions of the candidate image frames comprises:
matching the characteristics of the plurality of sub-regions of the reference image frame to the characteristics of the plurality of sub-regions of a given candidate image frame in a manner to consider a number of occlusion patterns of the object within the given candidate image frame.

10. The method of claim 1, wherein comparing characteristics of the plurality of sub-regions of the reference image frame to characteristics of the plurality of sub-regions of the candidate image frames and determining similarity measurements comprises:
for a given comparison, matching the characteristics of the plurality of sub-regions of the reference image frame to the characteristics of the plurality of sub-regions of a given candidate image frame in a cyclic manner so as to rotate sub-regions around a center region resulting in a plurality of different combinations of sub-region pairs between the reference image frame and the given candidate image frame;
determining the similarity measurements for the combinations of sub-region pairs; and
determining the candidate image frame with a minimum of similarity measurements.

11. The method of claim 1, further comprising:
for a given comparison, determining a minimum of the similarity measurements of a given candidate image frame.

12. A non-transitory computer readable medium having stored thereon instructions that, upon execution by a computing device, cause the computing device to perform functions comprising:
receiving an indication of an object within a sequence of video frames;
selecting, from the sequence of video frames, a reference image frame indicative of the object and candidate image frames representative of possible portions of the object;
dividing the reference image frame and the candidate image frames into multiple cells;
defining, for the reference image frame and the candidate image frames, a plurality of sub-regions of the multiple cells, wherein one or more of the sub-regions include the same cells for overlapping representations and wherein the plurality of sub-regions include multiple sizes;
comparing characteristics of the plurality of sub-regions of the reference image frame to characteristics of the plurality of sub-regions of the candidate image frames and determining similarity measurements; and
based on the similarity measurements, tracking the object within the sequence of video frames.

13. The non-transitory computer readable medium of claim 12, wherein selecting, from the sequence of video frames, the candidate image frames representative of possible portions of the object comprises extracting portions of the object occluded by another object.

14. The non-transitory computer readable medium of claim 12, wherein tracking the object within the sequence of video frames comprises:
   determining matches between the candidate image frames and the reference image frame; and
   based on mis-matches between the candidate image frames and the reference image frame within a portion of the sequence of video frames, performing target reacquisition within a subsequent portion of the sequence of video frames.

15. The non-transitory computer readable medium of claim 12, wherein comparing characteristics of the plurality of sub-regions of the reference image frame to characteristics of the plurality of sub-regions of the candidate image frames comprises:
   matching the characteristics of the plurality of sub-regions of the reference image frame to the characteristics of the plurality of sub-regions of a given candidate image frame in a manner to consider a number of occlusion patterns of the object within the given candidate image frame.

16. A system comprising:
   a camera to collect information of an environment of a vehicle and to output a sequence of video frames;
   a processor to track an object within the sequence of video frames by:
      determining, from the sequence of video frames, a reference image frame indicative of the object and candidate image frames representative of possible portions of the object;
      dividing the reference image frame and the candidate image frames into multiple cells;
      defining, for the reference image frame and the candidate image frames, a plurality of sub-regions of the multiple cells, wherein one or more of the sub-regions include the same cells for overlapping representations and wherein the plurality of sub-regions include multiple sizes;
      comparing characteristics of the plurality of sub-regions of the reference image frame to characteristics of the plurality of sub-regions of the candidate image frames and determining similarity measurements; and
      based on the similarity measurements, tracking the object within the sequence of video frames.

17. The system of claim 16, wherein determining, from the sequence of video frames, the candidate image frames representative of possible portions of the object comprises extracting portions of the object occluded by another object.

18. The system of claim 16, wherein tracking the object within the sequence of video frames comprises:
   determining matches between the candidate image frames and the reference image frame; and
   based on mis-matches between the candidate image frames and the reference image frame within a portion of the sequence of video frames, performing target reacquisition within a subsequent portion of the sequence of video frames.

19. The system of claim 16, wherein comparing characteristics of the plurality of sub-regions of the reference image frame to characteristics of the plurality of sub-regions of the candidate image frames and determining similarity measurements comprises:
   for a given comparison, matching the characteristics of the plurality of sub-regions of the reference image frame to the characteristics of the plurality of sub-regions of a given candidate image frame in a cyclic manner so as to rotate sub-regions around a center region resulting in a plurality of different combinations of sub-region pairs between the reference image frame and the given candidate image frame;
   determining the similarity measurements for the combinations of sub-region pairs; and
   determining the candidate image frame with a minimum of similarity measurements.

20. The system of claim 16, wherein the processor further determines, for a given comparison, a minimum of the similarity measurements of a given candidate image frame.

* * * * *